No. 774,461. PATENTED NOV. 8, 1904.
P. WOLF.
PIPE CLEANER.
APPLICATION FILED JUNE 21, 1904.
NO MODEL. 2 SHEETS—SHEET 1.

Witnesses:

Inventor:
Philip Wolf
by Hauff v Bresen Att'y.

No. 774,461. PATENTED NOV. 8, 1904.
P. WOLF.
PIPE CLEANER.
APPLICATION FILED JUNE 21, 1904.
NO MODEL. 2 SHEETS—SHEET 2.
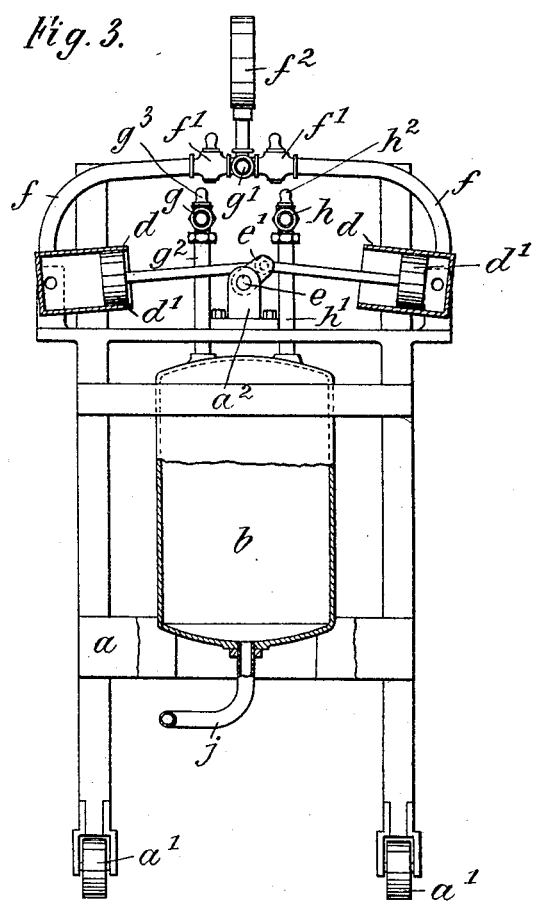
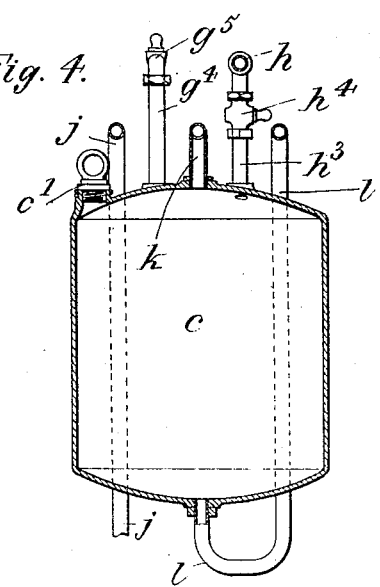

No. 774,461.

Patented November 8, 1904.

UNITED STATES PATENT OFFICE.

PHILIP WOLF, OF NEW YORK, N. Y.

PIPE-CLEANER.

SPECIFICATION forming part of Letters Patent No. 774,461, dated November 8, 1904.

Application filed June 21, 1904. Serial No. 213,465. (No model.)

*To all whom it may concern:*

Be it known that I, PHILIP WOLF, a citizen of the United States, residing at New York city, borough of Manhattan, county and State of New York, have invented a new and Improved Pipe-Cleaner, of which the following is a specification.

This invention relates to an improved apparatus for cleaning beer, ale, water, gas, and other pipes. The apparatus is so constructed that the pipes to be cleaned may be subjected successively to the action of a stream of water, a stream of a dissolving solution, and a jet of compressed air, by which means a thorough removal of the sediments may be effected.

Figure 1:
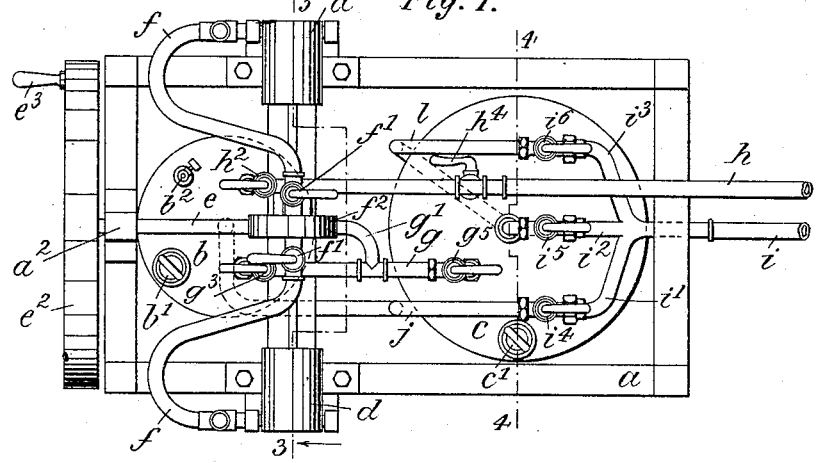
Figure 2:
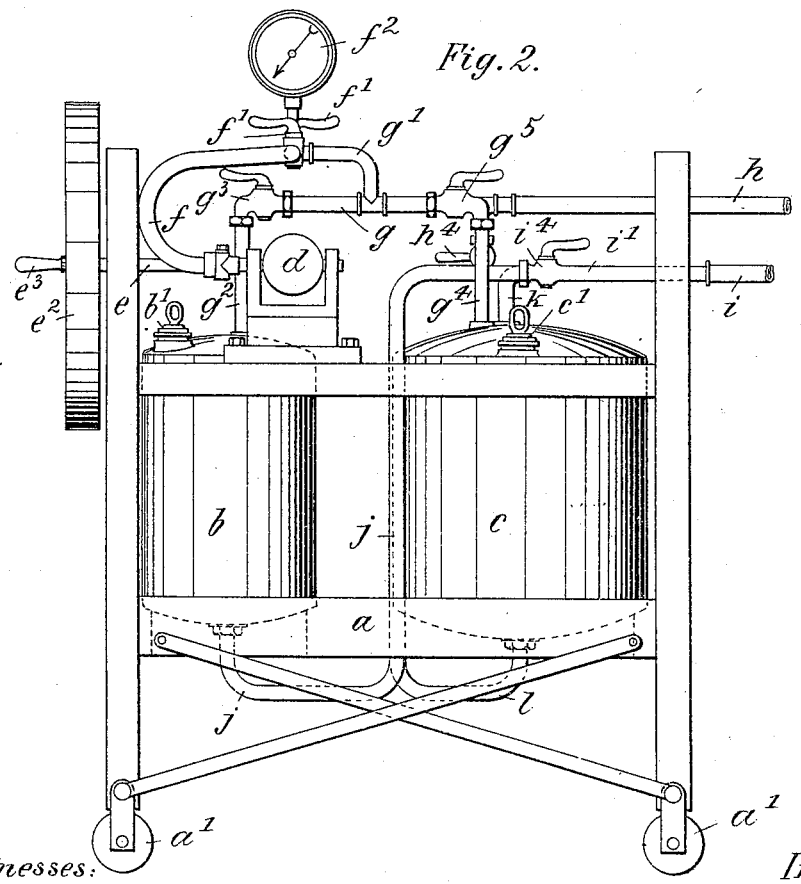

In the accompanying drawings, Figure 1 is a plan of my improved pipe-cleaner; Fig. 2, a side elevation thereof; Fig. 3, a cross-section on line 3 3, Fig. 1, showing the water-tank partly in section; and Fig. 4, a cross-section on line 4 4, Fig. 1.

The letter $a$ represents a truck or movable frame, supported upon rollers $a'$ and carrying a water-tank $b$ and a combined compressed air and solution tank $c$. The tank $b$ has a hand-hole $b'$ and a vent $b^2$, while the tank $c$ has a filling-opening $c'$.

$d\ d$ are the cylinders of an air-pump, the pistons $d'$ of which are connected to the crank $e'$ of a crank-shaft $e$, journaled in bearings $a^2$ and carrying a fly-wheel $e^2$, having handle $e^3$. The air is delivered from cylinders $d\ d$ through pipes $f$, having cocks or valves $f'$ and gage $f^2$ to the branch $g'$ of a pipe $g$. This pipe communicates by branch $g^2$, having cock $g^3$, with the top of water-tank $b$ and by branch $g^4$, having cock $g^5$, with the top of solution-tank $c$. The branch $g'$ enters pipe $g$ between the cocks $g^3$ and $g^5$.

$h$ is a water-supply pipe which communicates by branch $h'$, having cock $h^2$, with the top of water-tank $b$ and by branch $h^3$, having cock $h^4$, with the top of the solution-tank $c$.

$i$ is the discharge-pipe adapted to be coupled to the tube to be cleaned and provided with three branches $i'\ i^2\ i^3$. The branch $i'$ has cock $i^4$ and communicates by pipe $j$ with the bottom of water-tank $b$. The branch $i^2$ has cock $i^5$ and communicates by pipe $k$ with the top of solution-tank $c$. The branch $i^3$ has cock $i^6$ and communicates by pipe $l$ with the bottom of solution-tank $c$.

In use the tank $c$ is partly filled with a suitable salt or soda solution, which is selected to dissolve the sediments accumulating in beer or other pipes. The pipe $h$ is coupled to a water-service pipe, and the pipe $i$ is coupled to the tube to be cleaned. The cock $h^4$ is closed, the cock $h^2$ opened, the cock $g^3$ closed, and the cock $g^5$ opened. Water will thus flow through pipe $h$ into tank $b$, and the air-pump being meanwhile operated will force the compressed air into tank $c$ above the solution contained therein. When the tank $b$ is filled, the cock $h^2$ is closed, and after the proper air-pressure has been obtained in tank $c$ the pump is stopped, the cocks $f'$ are closed, and the cock $g^3$ is opened. Air under pressure will thus flow from tank $c$, through branch $g^4$, pipe $g$, and branch $g^2$ into tank $b$ to place the water in said tank under pressure. The cock $i^4$ is opened to eject this water through pipe $j$, branch $i'$, and pipe $i$ into the tube to be cleaned, and thus subject the latter to a preliminary washing. Next the cock $i^4$ is closed and the cock $i^6$ is opened to eject the chemical solution under pressure into the tube through pipe $l$, branch $i^3$, and pipe $i$. After the discharge of the solution has taken place the cock $i^6$ is closed and the cock $i^5$ opened to force a jet of compressed air from top of tank $c$, through pipe $k$, branch $i^2$, and pipe $i$ into the tube, and thereby blow out the dissolved sediments. Finally, the cock $i^5$ is closed and cock $i^4$ reopened to rinse out the tube by a stream of water from tank $b$. Should water under pressure be available, it is of course unnecessary to admit compressed air into tank $b$ by opening cock $g^3$. The cock $h^4$ and branch $h^3$ are utilized to store water in tank $c$ and convey it to the place of consumption in case the latter lacks a proper water-supply.

What I claim is—

A pipe-cleaner comprising a water-tank, a combined compressed air and solution tank, a connecting-pipe having a pair of cocks, an air-pump, a branch connecting said pump with the pipe between the cocks to form direct communication between the pump and each of the tanks, a discharge-pipe having three branches, and means for connecting said branches respectively with the bottom of the water-tank and with the top and bottom of the combined compressed air and solution tank, substantially as specified.

Signed by me at the city of New York this 20th day of June, 1904.

PHILIP WOLF.

Witnesses:
FRANK V. BRIESEN,
ARTHUR ZUMPE.